US012212011B2

(12) United States Patent
Learmonth et al.

(10) Patent No.: US 12,212,011 B2
(45) Date of Patent: Jan. 28, 2025

(54) RETROFIT BATTERY MODULE

(71) Applicant: Master Lock Company LLC, Oak Creek, WI (US)

(72) Inventors: Darren Learmonth, Austin, TX (US); Jason Williams, Atlanta, GA (US); Garrett Lovejoy, Madison, NC (US); Martin Huddart, New Haven, CT (US)

(73) Assignee: Master Lock Company LLC, Oak Creek, WI (US)

( * ) Notice: Subject to any disclaimer, the term of this patent is extended or adjusted under 35 U.S.C. 154(b) by 238 days.

(21) Appl. No.: 17/092,642

(22) Filed: Nov. 9, 2020

(65) Prior Publication Data

US 2021/0193979 A1 Jun. 24, 2021

Related U.S. Application Data

(60) Provisional application No. 62/950,634, filed on Dec. 19, 2019.

(51) Int. Cl.
*H01M 10/42* (2006.01)
*E05B 47/00* (2006.01)
*H01M 50/209* (2021.01)
*H01M 50/229* (2021.01)

(52) U.S. Cl.
CPC ....... *H01M 50/209* (2021.01); *E05B 47/0001* (2013.01); *H01M 10/4257* (2013.01); *E05B 2047/0058* (2013.01); *E05B 2047/0067* (2013.01); *E05B 2047/0097* (2013.01); *H01M 2010/4278* (2013.01); *H01M 2220/10* (2013.01)

(58) Field of Classification Search
CPC .......... H01M 50/209; H01M 10/4257; H01M 2010/4278; H01M 2220/10; E05B 47/0001; E05B 2047/0058; E05B 2047/0067
USPC .......................................... 307/66
See application file for complete search history.

(56) References Cited

U.S. PATENT DOCUMENTS

| 10,711,489 | B1* | 7/2020 | Zhang | E05B 63/04 |
| 2003/0183814 | A1* | 10/2003 | Marsh | G08B 15/02 |
| | | | | 256/1 |
| 2016/0333608 | A1* | 11/2016 | Ingle | E05B 47/0004 |
| 2018/0194021 | A1* | 7/2018 | Nguyen | B26B 1/08 |
| 2018/0340350 | A1* | 11/2018 | Johnson | G07C 9/00944 |
| 2020/0024867 | A1* | 1/2020 | Lee | G07C 9/00309 |
| 2020/0349786 | A1* | 11/2020 | Ho | G06V 40/172 |

* cited by examiner

*Primary Examiner* — Rexford N Barnie
*Assistant Examiner* — Swarna N Chowdhuri
(74) *Attorney, Agent, or Firm* — Foley & Lardner LLP

(57) ABSTRACT

Disclosed here in is a retrofit device compatible with existing electronic locks, the device including a housing, one or more rechargeable batteries capable of providing power to the device, the existing electronic lock, and one or more accessories, and a module enabling wireless communication with one or more external electronic devices. The device is configured such that power can be delivered even when one or more of the batteries is removed, dead, or otherwise incapable of providing power. The module is configured to interface with the existing electronic lock such that commands can be delivered and executed wirelessly.

12 Claims, 17 Drawing Sheets

RETROFIT BATTERY MODULE

RELATED APPLICATIONS

This application claims the benefit under 35 U.S.C. § 119(e) to U.S. Provisional Application Ser. No. 62/950,634, filed on Dec. 19, 2019, which is herein incorporated by reference in its entirety.

FIELD

The technology disclosed herein relates generally to door locks, specifically to a retrofit device configured to provide electric power and/or smart connectivity to existing electronic locks.

BACKGROUND

Locks are conventionally used to secure access points (e.g., doors, windows, etc.) from unauthorized entry. The earliest locks were purely mechanical. These locks used a key to physically manipulate the relative positions of one or more internal components to lock or unlock an access point. As technology matured, locks began incorporating electronic elements to improve security and ease of use. Some locks replaced physical keys with alternate credentials such as passwords, magnetic tokens, or biometrics, which when presented and validated would lock or unlock the access point. Some of these locks manipulate the internal lock components via electronic actuators such as motors, solenoids, etc. Such locks may also include sensors to track the relative positions of internal components. Recent technological advances have further improved electronic locks by connecting them to mobile devices and the cloud via wired and wireless signals. Doing so has further increased the safety, ease of use, and experience associated with locks.

SUMMARY

According to one aspect, a smart retrofit battery pack for a preexisting electronic lock is provided. The pack includes a housing electrically couplable to the electronic lock. A plurality of rechargeable battery modules is also included. Each of the plurality of rechargeable battery modules is removably electrically coupled to the housing. A wireless communication module is integral to the housing capable of interfacing with the preexisting electronic lock and at least one external wireless device.

According to another aspect, a retrofit battery pack, a retrofit battery pack for a preexisting electronic lock is provided. The pack includes a housing electrically couplable to the electronic lock. A plurality of rechargeable battery modules is also included. Each of the plurality of rechargeable battery modules is removably electrically coupled to the housing. When at least one of the plurality of rechargeable battery modules is removed from the housing, the remaining one or ones of the plurality of rechargeable battery modules is configured to provide power to the housing and the housing thereby is configured to provide power to the preexisting electronic lock.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
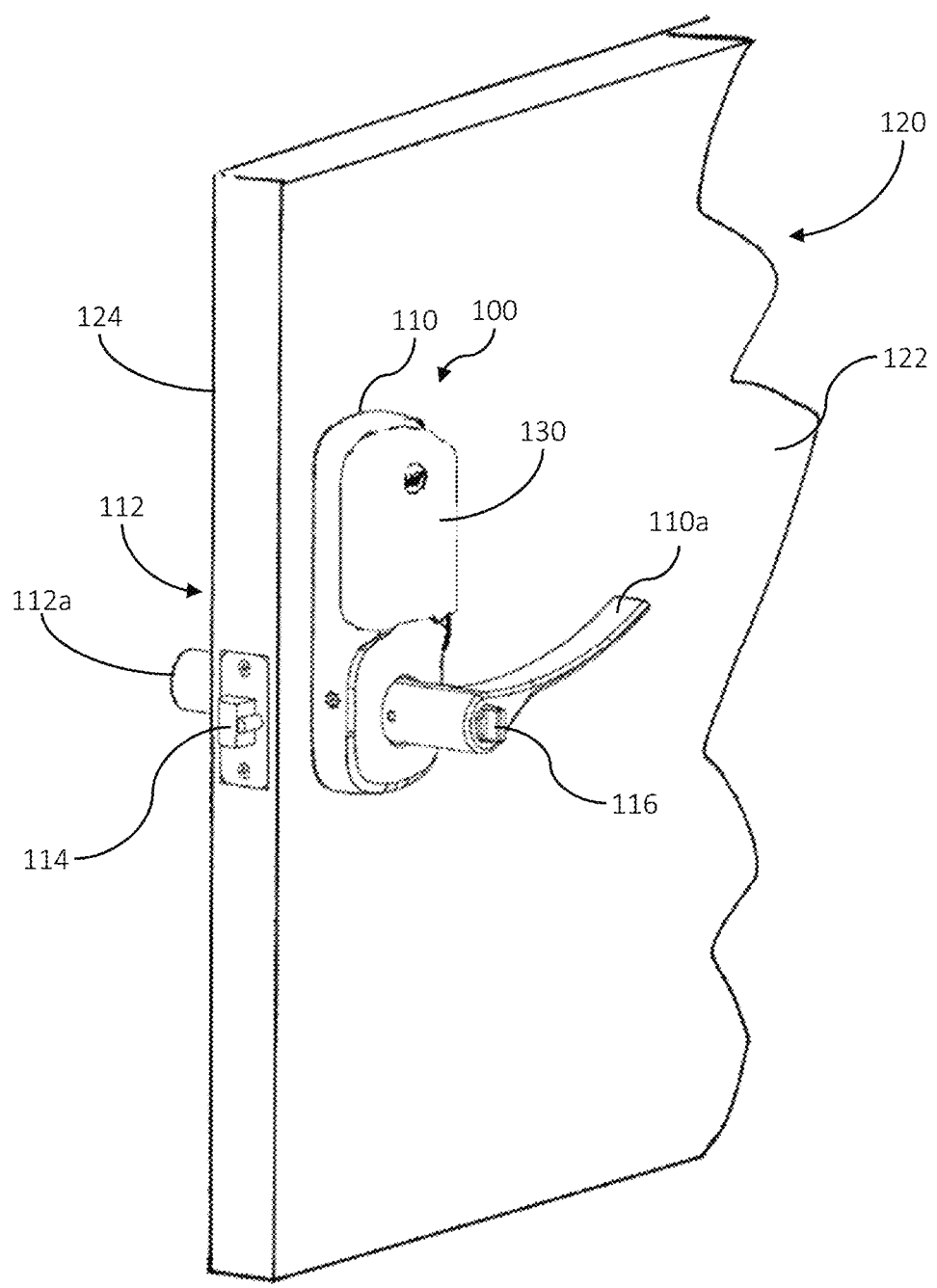
FIG. 1A is a front, top, right side perspective view of an exemplary electronic lock mounted to an interior side of a door.

Electronic locks exist to secure access points. Such locks are actuated when a user presents a valid credential or token (e.g., passcode, magnetic card, biometric, RFID tag, etc.). A power source is required for both the processing required to validate a credential and the actuation that allows or disallows access. This power source may be internal, as is the case with a battery, or external, as is the case with a wired connection to wall power. Traditionally, battery enabled locks use alkaline batteries which can be expensive, drain rapidly, and are inconvenient to dispose of. During periods when these batteries are dead or being replaced, the lock is not powered, which can prevent users from gaining access as needed. Directly powering these locks can be beneficial, but the installing the necessary wiring requires significant labor and cost, which can be prohibitive for consumers and businesses.

Some electronic locks are self-contained in that they are not configured to communicate with external wireless devices, such as mobile phones, or networks, such as the internet. Other electronic locks are configured to communicate with such external wireless devices or networks by use of a wireless communications module connected to the electronic lock. The communication pathways enabled by these modules enables users to interact with the lock. For example, they may allow users to monitor and/or change the lock status (e.g., lock or unlock the lock).

The inventors have recognized the benefits of an easy to install apparatus that is backwards compatible with electronic door locks and provides for a rechargeable power source and/or wireless communication.

Such an apparatus may be configured to removably fit an existing internal cavity within an electronic lock (e.g., the battery cavity, a space behind a decorative escutcheon or rosette, etc.) or an existing mortise within the door the lock is mounted to. Alternate embodiments may be configured to be affixed to an exterior surface proximate to the lock, door, or access point.

This apparatus may provide power to itself and the lock via one or more internal power sources eliminating the need to use alkaline batteries and/or route electric wiring to the electronic lock from an external power source. The power source may include one or more battery modules (or other power storage components) which may be rechargeable and provide additional benefits such as improved battery life per a given volume due to the higher energy density rechargeable battery modules typically have compared to alkaline batteries. In some embodiments, the power source may also provide power to additional components and/or sensors on or near the electronic lock including, but not limited to microphones, cameras, accelerometers, and photoresistors. Such a system may enable continued operation when one or more of the battery modules is not providing power. That is, when one or more of the battery modules is removed, dead, and/or recharging, one or more of the remaining installed battery modules may provide requisite power to the electronic lock. Alternate embodiments may take power from external sources such as wall power or photovoltaic cells in communication with the apparatus and/or lock.

Some embodiments may provide a retrofit capability that allows wireless communication between the electronic lock and an external wireless device (e.g., mobile phone, wireless bridge, internet router, etc.) allowing authorized users to locally or remotely monitor the lock, manipulate the lock status (e.g., lock or unlock), track and view lock or user activity, track and view battery life, and more. A combined retrofit battery pack with a wireless communications module coupled thereto may be termed herein as a smart retrofit battery pack. As used herein a mobile device includes, but is not limited to, a cell phone, such as Apple's iPhone™, other portable electronic devices, such as Apple's iPod Touches™, Apple's iPads™, and mobile devices based on Google's Android™ operating system, and any other portable electronic device that includes software, firmware, hardware, or a combination thereof that is capable of at least receiving the signal, decoding if needed, exchanging information with a server to verify information. Typical components of mobile device may include but are not limited to persistent memories like flash ROM, random access memory like SRAM, a camera, a battery, LCD driver, a display, a cellular antenna, a speaker, a Bluetooth™ circuit, and Wi-Fi circuitry, where the persistent memory may contain programs, applications, and/or an operating system for the mobile device. A mobile device can be a key fob. A key fob, which can be a type of security token, is a small hardware device with built in authentication mechanisms. It is used to manage and secure access to network services, data, provides access, communicates with door systems to open and close doors and the like.

In one embodiment, the apparatus includes a housing for interfacing one or more rechargeable battery modules and a wireless communications module to the electronic lock. Such a housing may provide for increased fire rating, such as the housings described in co-pending U.S. patent application Ser. Nos. 16/009,454 and 16/517,848, each incorporated herein by reference in its entirety.

In one embodiment, the apparatus housing may be configured to include a wireless communications module. The relatively larger size of an apparatus configured to hold a wireless communications module and a power source may provide additional benefits over a module solely configured to hold a wireless communications module. For example, the increased size may allow the use of a relatively larger and/or more powerful module. The size may also allow for a more strategic positioning of the module within the apparatus and the electronic lock. Combined, these features may improve the wireless communication signal.

In one embodiment, the apparatus housing may include one or more additional features such as a microphone to detect a knock on the door. Alternatively the housing may include an accelerometer used for this purpose. Further embodiments may utilize both in combination. In this respect, the knock on the door may be detected and the wireless communication module may thereafter send a signal to the external wireless device alerting a user that someone is at the door. Other embodiments may use alternative sensors to detect the presence of a person at the door including cameras, proximity sensors including infrared proximity sensors, or motion detectors including passive infrared, microwave, and ultrasonic motion detectors.

In one embodiment, an additional feature such as tamper detection may be included. In this regard, a microphone and/or accelerometer may be used to detect vibrations or noises that may be mapped to a signal indicative of someone tampering with the lock, for example someone attempting to pick the lock, jimmy the latch, or otherwise simply force the door open.

In one embodiment, other sensors or detectors may be included, such as dawn/dusk sensors, occupancy sensors, proximity sensors, temperature sensors, and/or door open/close sensors. Such sensors may provide added functionality, such as turning lights on or off depending on time of day and/or occupancy and/or proximity, alerting the status of the lock based on the time of day and/or occupancy, alerting the status of the door based on detecting whether the door is opened or closed, and otherwise interfacing with other systems in a home such as sensing outdoor and/or indoor temperature and communicating with a dwelling heating/cooling system to adjust the interior temperature accordingly.

In one embodiment, the communication module may act as a hub for a local door network. In this regard, any of the above noted or other sensors may be remote from the lock but may communicate with the module over a relatively short distance communication protocol such as Bluetooth™, Wi-Fi, ZigBee™, z-wave, etc. and the communication module may then relay any detected characteristic to a home network, the internet, or to any other external wireless device.

Figure 1B:
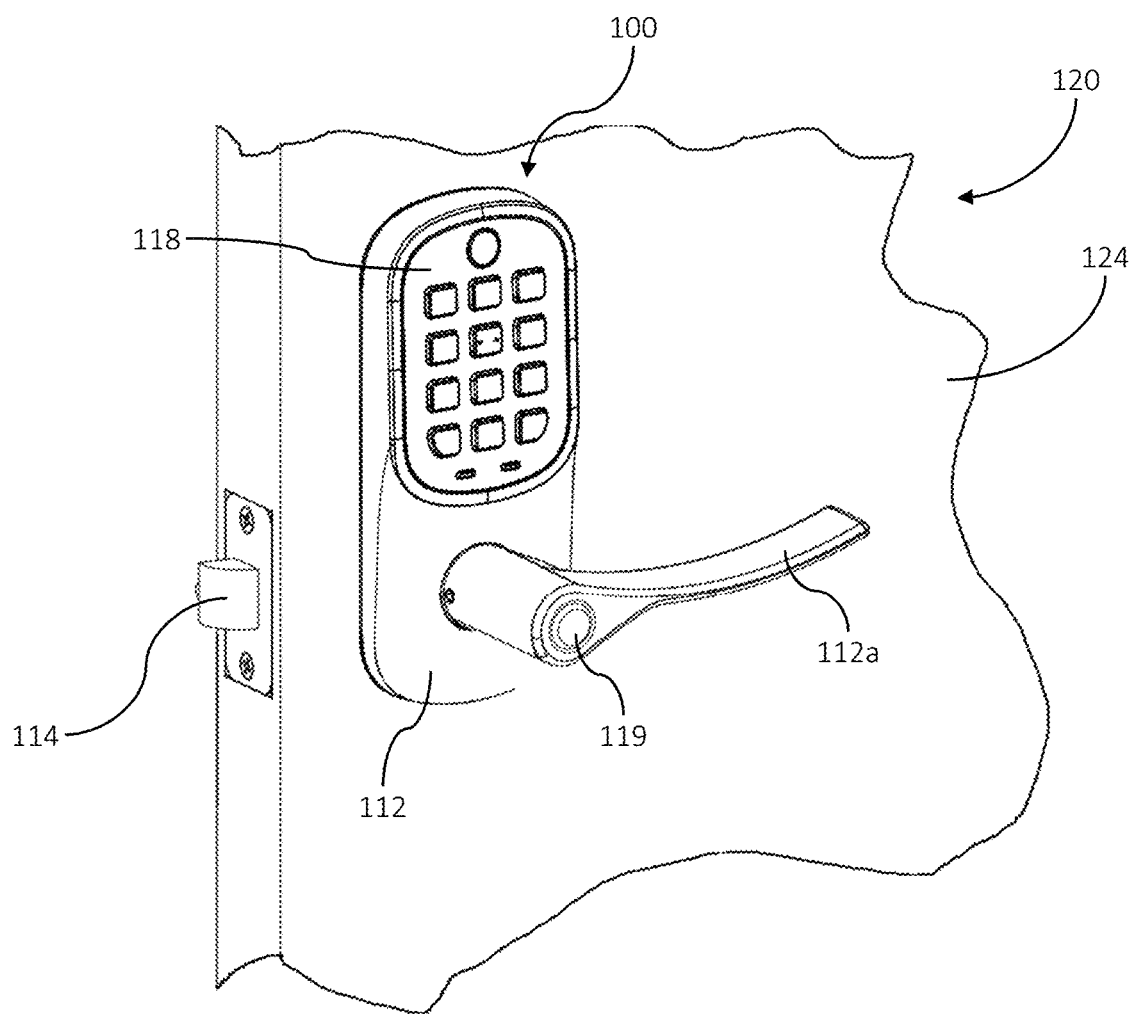
FIG. 1B is a front, top, right side perspective view of the exemplary electronic lock mounted to an exterior side of a door.

Turning now to the figures, according to one embodiment illustrated in FIGS. 1A and 1B an electronic door lock 100 includes a first lock housing 110 mounted to a first side 122 (e.g., interior) of a door 120 and a second lock housing 112 mounted to a second side 124 (e.g., exterior) of door 120. It should be appreciated that electronic door lock 100 may be a pre-existing and/or pre-installed door lock. The upper exterior of first body portion 110 includes a removable face plate 130. Protruding outwardly from the lower portions of each the first and second housings 110 and 112 are a first handle 110a (e.g., interior) and a second handle 112a (e.g., exterior). These handles can be of a variety of form factors (e.g., handle, knob, lever, etc.) as the present disclosure is not limited in this respect. Handles 110a and 112a are operatively attached to latch 114 through a series of internal lock components as would be familiar to those of skill in the art. When the electronic door lock 100 is in an unlocked state, rotating either the first or second handle 110a or 112a causes latch 114 to retract allowing door 120 to be opened. When the electronic door lock 100 is in a locked state, components internal to the lock in a way familiar to those of skill in the art prevent the user from rotating one or both of the handles 110 and 112, preventing latch 114 from retreating, preventing door 120 from being opened. The door is transitioned from a locked to unlocked state by either rotating lock button 116 of the first handle 110a, entering the correct passcode on keypad 118 of the second lock housing 112, or manually twisting a key in the keyway 119 on the second door handle 112a. The lock embodied in FIGS. 1A and 1B is an electronic door lock with keypad and lever handle, however it should be appreciated that the disclosure is not limited to any specific type of lock.

Figure 1C:
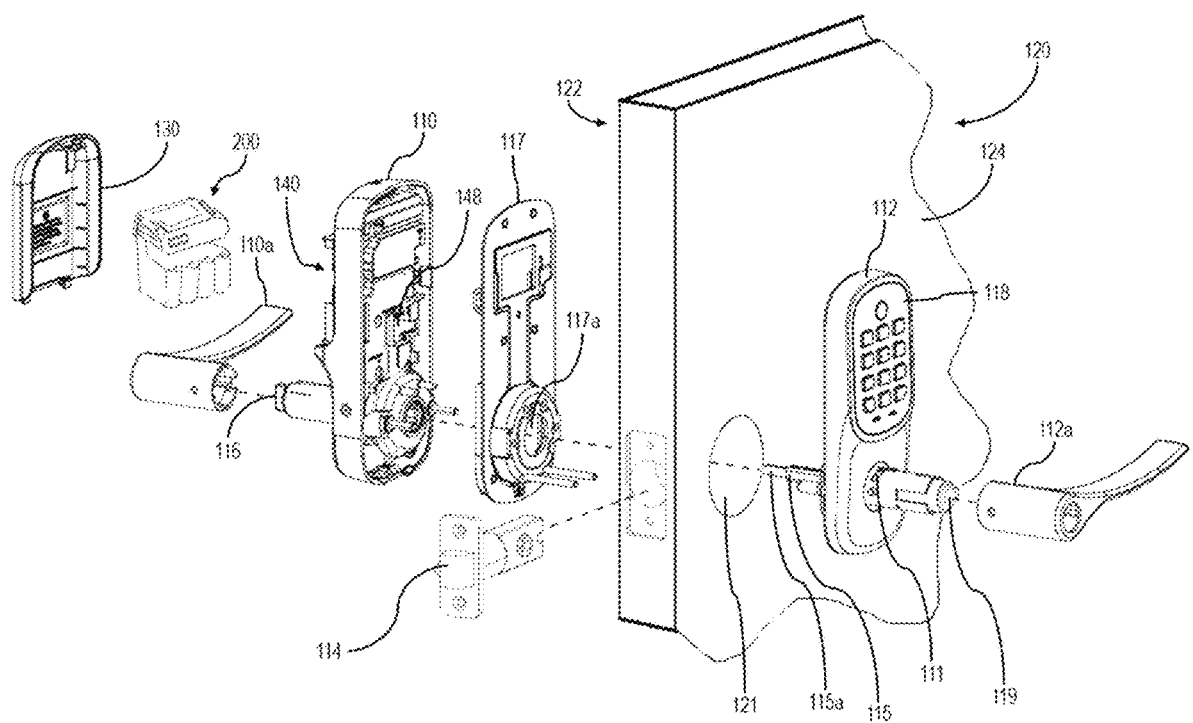
FIG. 1C is an exploded perspective view of the exemplary electronic lock and the smart retrofit rechargeable battery pack with connectivity bridge.

FIG. 1C shows an exploded view of electronic door lock 100 including one embodiment of a smart retrofit battery pack 200. Interior mounting plate 117 is used to attach the first lock housing 110 and all components contained therein/thereon to door 120. Mounting plate 117 contains multiple through holes and embossed features that facilitate properly alignment and installation on door 120. Specifically, mounting plate 117 contains through hole 117a which, when properly mounted, is concentric with door bore hole 121. Through these holes, and a corresponding hole on the mounting plate used to attached second door housing 112 to door 120 (not pictured), handles 110a and 112a are operatively connected by a series of internal components including cylinder 111, spindle 115, and driver 115a. In an unlocked state, rotating either handle 110a or 112a rotates spindle 115, which has a square cross section. This square cross section enables the rotational motion of the spindle to be transferred to cam drive units internal to the latch assembly. Rotating these cam drive units results in the linear motion of a transmission plate, which in turn pulls latch 114, enabling the door to open. When in a locked state, driver 115a prevents the rotation of spindle 115, thereby preventing latch 114 from being pulled as previously described.

Figure 1D:
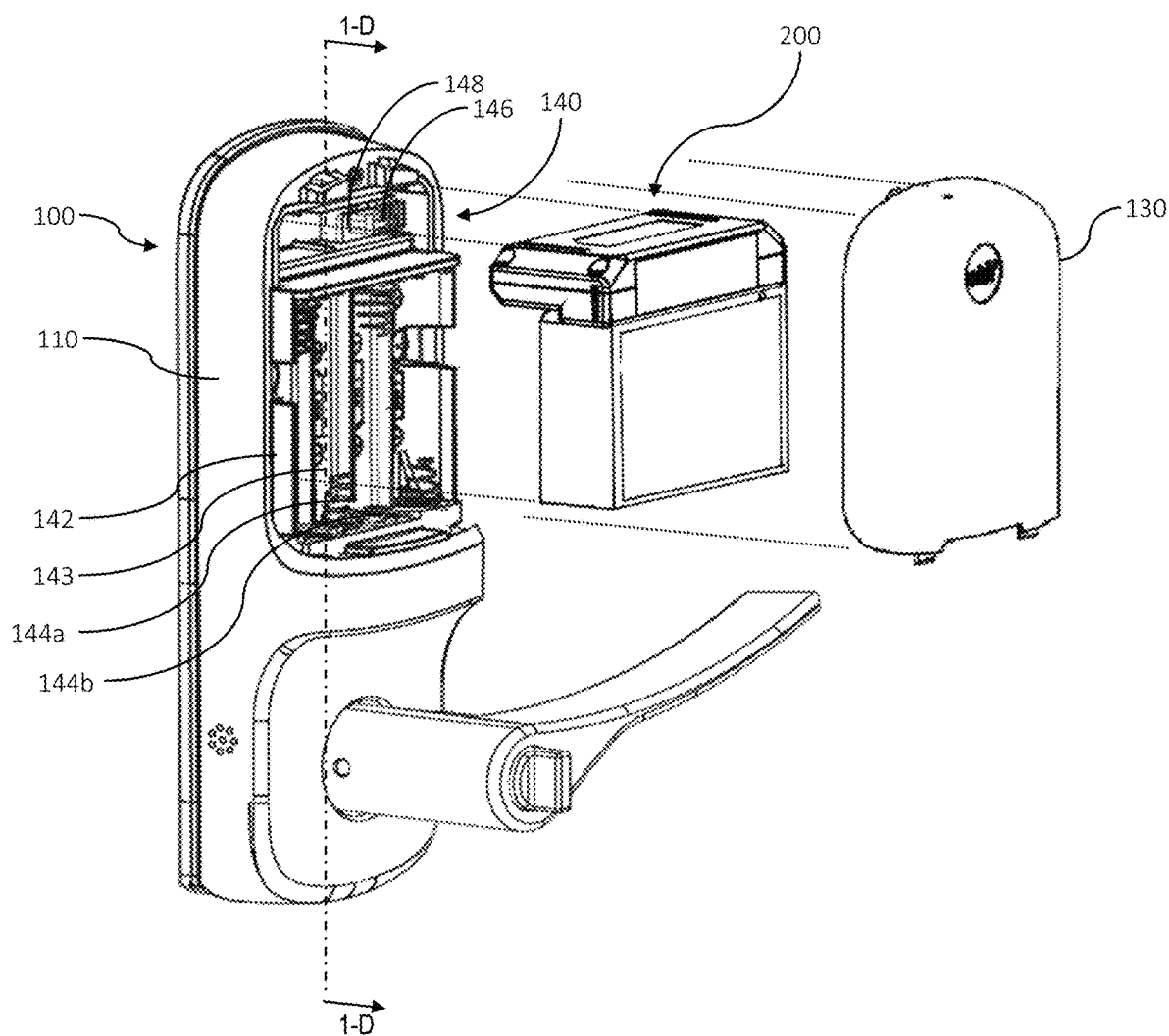
FIG. 1D is an exploded perspective view of the exemplary electronic lock and the smart retrofit rechargeable battery pack with connectivity bridge.

FIG. 1D shows electronic door lock 100 with faceplate 130 removed, exposing interior cavity 140 located within first body portion 110. Additionally, FIG. 1D shows one embodiment of a smart retrofit battery pack 200 as it would be installed in interior cavity 140. Interior cavity 140 contains multiple components including, but not limited to, battery chassis 142, PCB 148 spanning the area behind and coplanar with the rear face of battery chassis 142, and connection port 146 mounted to a tab on the upper right hand corner of PCB 148. Battery chassis 142 comprises a plurality of slots 143 which secure individual batteries, each comprising a positive terminal 144a and negative terminal 144b at opposite ends of the slots' lengths. In some embodiments, the positioning of the positive and negative terminals is alternated in adjacent slots. These terminals are configured to electrically connect batteries installed within battery chassis 142 to smart retrofit battery pack 200 and electronic door lock 100 for the purpose of distributing electrical power. Connection port 146 enables compatible modules to connect to and communicate with PCB 148 and other electronic components internal to door lock 100.

Figure 1E:
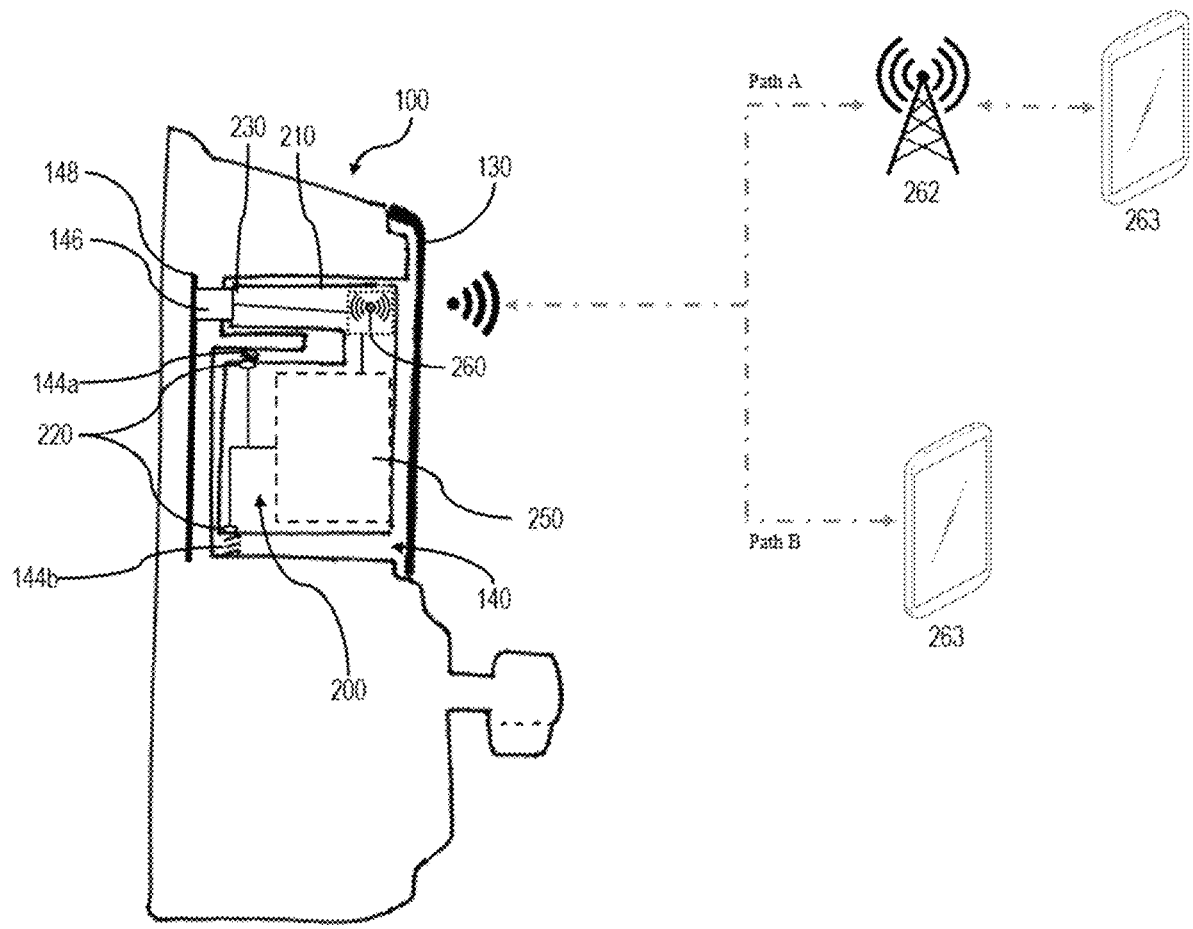
FIG. 1E is a section view taken along line 1D-1D of FIG. 1D showing the smart retrofit rechargeable battery pack with connectivity bridge installed in the exemplary electronic lock and schematically showing wireless connectivity.

FIG. 1E shows a section view of electronic door lock 100 with smart retrofit battery pack 200 installed taken along line 1D-1D of FIG. 1E. In this embodiment, smart retrofit battery pack 200 comprises of a main housing 210, a rechargeable battery module 250, contact pads 220, a wireless antenna 260, and connector 230.

As shown, main housing 210 is configured to nest with interior cavity 140 of electronic door lock 100 without interfering with normal installation of face plate 130.

Battery module 250 may be used to power any components constituting smart retrofit battery pack 200. For example, battery module 250 may provide power to antenna 260, or any other wireless device configured to communicate with external electronic devices. Additionally, battery module 250 may be used to power LED indicators 256, 257a, 257b, or any other components requiring electrical power to operate. In embodiments containing multiple battery modules, each individual battery module may be used to power all desired components such that there is no down time when one or more battery modules are unable to provide power (e.g., dead, removed for charging, etc.).

Battery module 250 is electronically connected to contact pads 260, which are electrically connected with positive and negative terminals 144a and 144b when smart retrofit battery pack 200 is installed in electronic door lock 100. Through this connection, the smart retrofit battery pack 200 is able to provide power (e.g., electric voltage and current) to electronic door lock 100. This power drives, among others, the lock components internal to door lock 100, allowing it to be locked and unlocked. In some embodiments, this battery pack could additionally be used to power sensors internal and external to the electronic lock 100 such as microphones, cameras, photoresistors, accelerometers, reed switches, etc. In embodiments containing multiple battery modules, each individual battery module may be used to power all desired components such that there is no down time when one or more battery modules are unable to provide power (e.g., dead, removed for charging, etc.). In some embodiments, battery module 250 may be contain 2000 to 3000 mAh with a cell voltage of 1.2V to 1.5V corresponding to the typical energy capacity and voltage of a AA alkaline battery. In other embodiments, battery module 250 may contain a larger energy capacity such as 3600 mAh to increase battery life over standard AA alkaline batteries. It should be noted that battery life is a function of usage and environment as well as energy capacity, here measured in mAh. As such, some usage patterns and environmental factors (e.g., extreme cold or hot weather) may result in higher or lower battery life when compared to standard AA alkaline batteries.

In the embodiment shown in FIG. 1E, wireless antenna 260 is shown to be located in the upper, exterior facing portion of smart retrofit battery pack 200. This may be a preferred location in that it provides better signal strength or simplifies internal wire routing. This wireless antenna may be powered via battery module 250 and is in communication with PCB 148 via an electronic connection between connector 230 and connection port 146. Wireless antenna 260 is shown to wirelessly communicate with one or more external devices. In one possible wireless communication pathway, shown by Path A, wireless antenna 260 is connected to the internet 262, from which one or more authorized connected devices 263 can communicate with the lock 100. In some embodiments, this internet connection may require an external wireless bridge which may be located in the consumers home. In an alternate embodiment, shown by Path B, wireless antenna 260 communicates locally with an authorized connected device 263. In some embodiments, both communication paths are possible. Any wireless communication protocol may be used for this communication including Bluetooth, Wi-Fi, ZigBee, z-wave, etc. Through either or both paths, authorized users are able to remotely send commands to and receive data from lock 100.

Figure 1F:
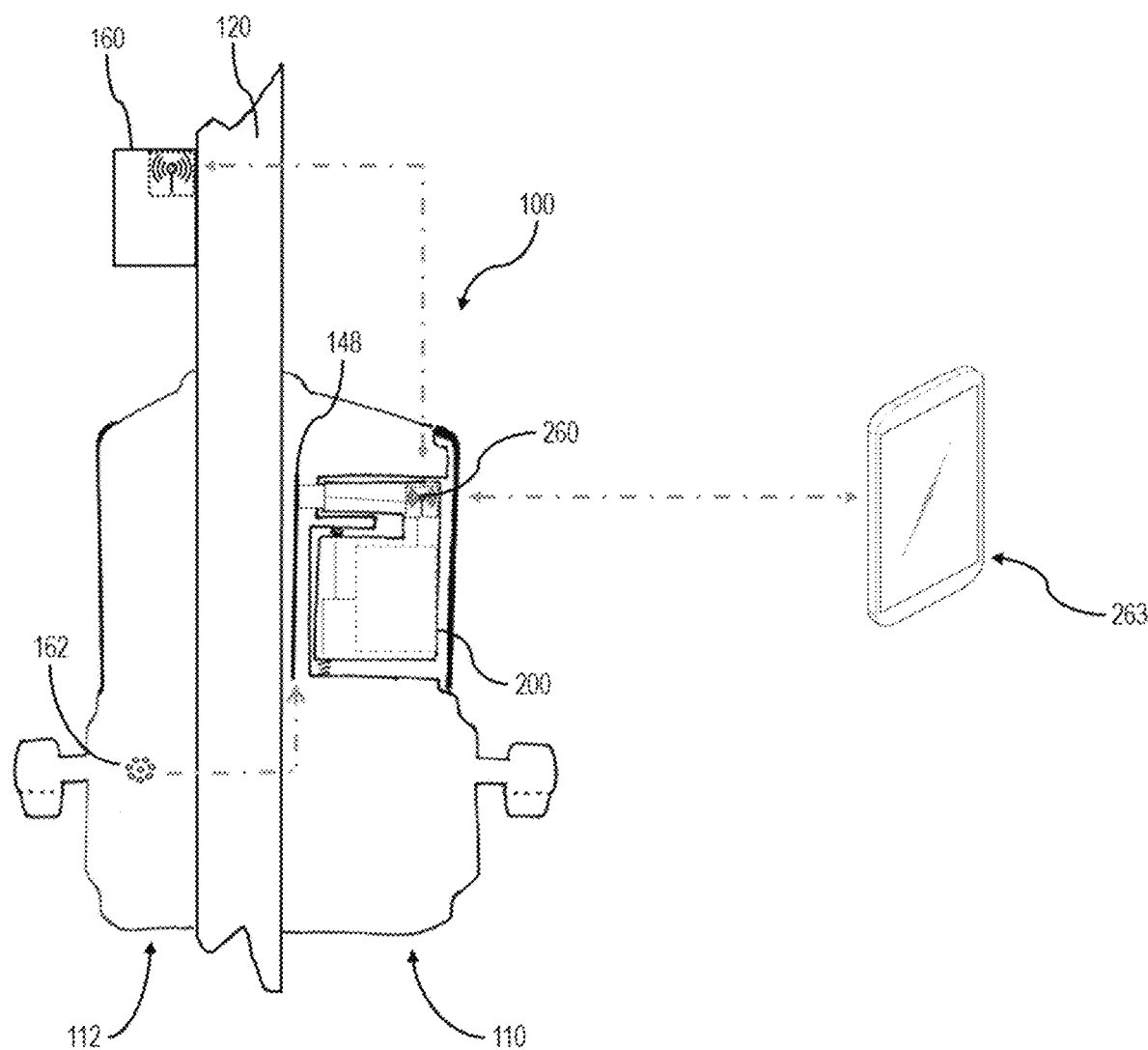
FIG. 1F is a section view taken along line 1D-1D of FIG. 1D showing the smart retrofit rechargeable battery pack with connectivity bridge installed in the exemplary electronic lock and schematically showing a different embodiment of wireless connectivity.

FIG. 1F is a schematic view showing one embodiment of electronic door lock 100 including a microphone 162 and auxiliary sensor 160 interfacing with smart retrofit battery pack 200.

In some embodiments, auxiliary sensor 160 is installed on the door is to sense one or more conditions, such as detecting door open/close status, knocking or tampering, temperature, proximity, occupancy, ambient lighting, time of day (night/day), images. Such sensor(s) may include an accelerometer, reed switch, or hall effect sensor for sensing door open/close status. In other embodiments, the proximity sensor may be used to detect motion correlating to the arrival of a guest at the door. In further embodiments, the sensor may be a camera to detect images, a light sensor to detect ambient lighting and/or nighttime/daytimes, a temperature sensor to detect interior and/or exterior temperature, or any other sensor suitable for fulfilling a desired application. Auxiliary sensor 160 may be configured to relay data to antenna 260 in smart retrofit battery pack 200 via any of the suitable local wireless communication protocols, such as those detailed above.

Included on the exterior lock housing is a microphone, 162, which may be used to detect knocking or tampering in some embodiments. It should be appreciated that one of more of these sensors may be used to senses more than one condition. For example, a proximity sensor may be used to detect both proximity of a person as well as whether the dwelling is occupied. Similarly, a camera, which may be an infrared camera, may be used to detect occupancy as well as temperature. While shown on the exterior of the door, it should be appreciated that the one or more sensor(s) may be housed in an interior cavity of the door, in an interior cavity of electronic door lock 100, or some other location proximate to electronic door lock 100. While only one sensor is shown, the disclosure is not limited in this respect and any number of sensors may be used and situated in any suitable location. Microphone 162 may send data to smart retrofit battery pack 200 via a similar wireless communication protocol or via a direct wired connection to PCB 148

Once smart retrofit battery pack 200 receives signals from the microphone 162 and/or auxiliary sensor 160, it may relay the data or a predetermined signal to an external wireless device 263. External wireless device 263 may also be configured to communicate directly with any of the external components for the purposes of triggering an action (e.g., lock or unlock the door), checking the status of any of the components (e.g., checking lock/unlock status), etc. While an abridged and direct line of communication between antenna 260 and external wireless device 263 is shown in FIG. 1F, it should be appreciated that this signal pathway may have one or more intermediaries such as those outlined in Path A of FIG. 1D as the disclosure is not limiting in this respect.

In some embodiments, an electronic lock 100 with smart retrofit battery pack 200 installed may serve as the central hub of a network of connected smart locks. For example, the electronic lock 100 with smart retrofit battery pack 200 shown in FIG. 1F may serve as an intermediary connecting one or more additional electronic locks with limited wireless communication capabilities (e.g., Bluetooth only) to a network they would otherwise be unable to access (e.g., Wi-Fi). This central hub configuration enables the additional electronic locks to have relatively cheaper, smaller wireless communication antennas which may require a lower amount of power to operate.

Figure 2:
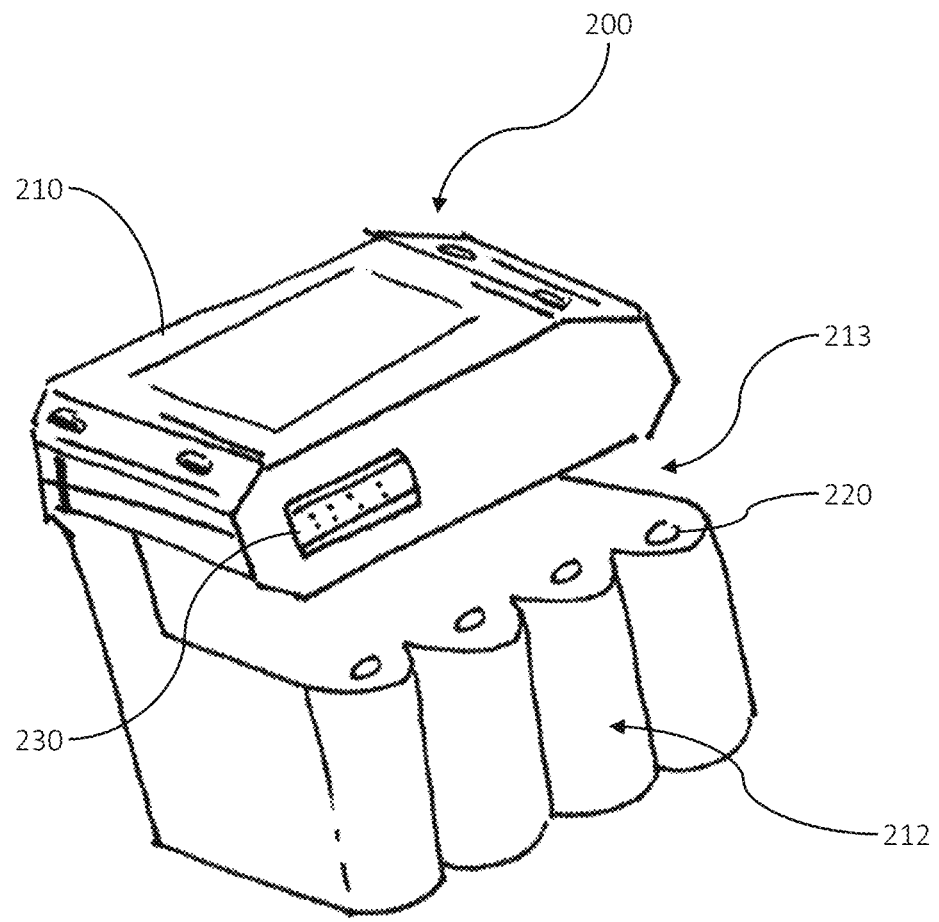
FIG. 2 is a perspective view of the smart retrofit rechargeable battery pack with connectivity bridge according to one embodiment.

FIG. 2 shows one embodiment of a smart retrofit battery pack 200. This pack includes a main housing 210 which is configured to nest within interior cavity 140 without interfering with normal installation and removal of face plate 130 as shown in FIG. 1D. To facilitate this nesting, one embodiment of smart retrofit battery pack 200 may include ridges 212 as shown which may be configured to mate with the individual slots 143 of battery chassis 142. Additionally, these ridges may help align pack 200 during installation and maximize space utilization allowing for larger battery modules 250, 251a, 251b to be used. Of course, it should be appreciated that the ridges need not be included in the housing. In some embodiments, one or more additional channels 213 are included to prevent interference with existing features located within cavity 140. It should be appreciated that the present disclosure is not limited with respect to what geometric features (e.g., chamfers, filets, extrusions, slots, etc.) are or are not included in the housing design. Any such features may be included in any suitable quantities or excluded to facilitate the nesting of pack 200 within an existing cavity.

In one embodiment, smart retrofit battery pack 200 may include its own faceplate or other exterior surface intended to replace faceplate 130. In some embodiments, this surface may include additional functional components such as photovoltaic cells for recharging batteries, sensors (e.g., microphones, accelerometers, sensors for detecting light such as photoresistors, etc.), or lights.

The embodiment of a smart retrofit battery pack 200 shown in FIG. 2 includes contact pads 220 arranged to form electrical connections with positive and negative terminals 144a and 144b of battery chassis 142 when the module is installed. While not visible in FIG. 2, corresponding conductive pads may be located on the underside of housing 210 such that each terminal in battery chassis 142 is in direct contact with a contact pad 220. Once the module is installed, the electrical connection formed between the contact pads 220 and positive and negative terminals 144a and 144b enables the transmission of electricity (e.g. current and/or voltage) from smart retrofit battery pack 200 to electronic door lock 100. The electric power delivered would be used to drive internal components, for example, to lock or unlock the door, power sensors, for example, microphones and/or accelerometers, and more.

It should be appreciated that the battery chassis of the door lock may be removable from some pre-existing door locks. In such cases, the retrofit battery module may be configured geometrically differently to fit with the door lock. In such instances, an alternative means of providing electronic power from the smart retrofit battery pack 200 to the existing electronic door lock 100 and any additional sensors and/or components would need to be provided. For example, in an embodiment where the battery chassis was electronically connected to the electronic door lock via a plug connector, the retrofit battery pack configured to replace the battery chassis may be configured to include the same connector as the chassis such that it could directly plug into the door lock.

Figure 3A:
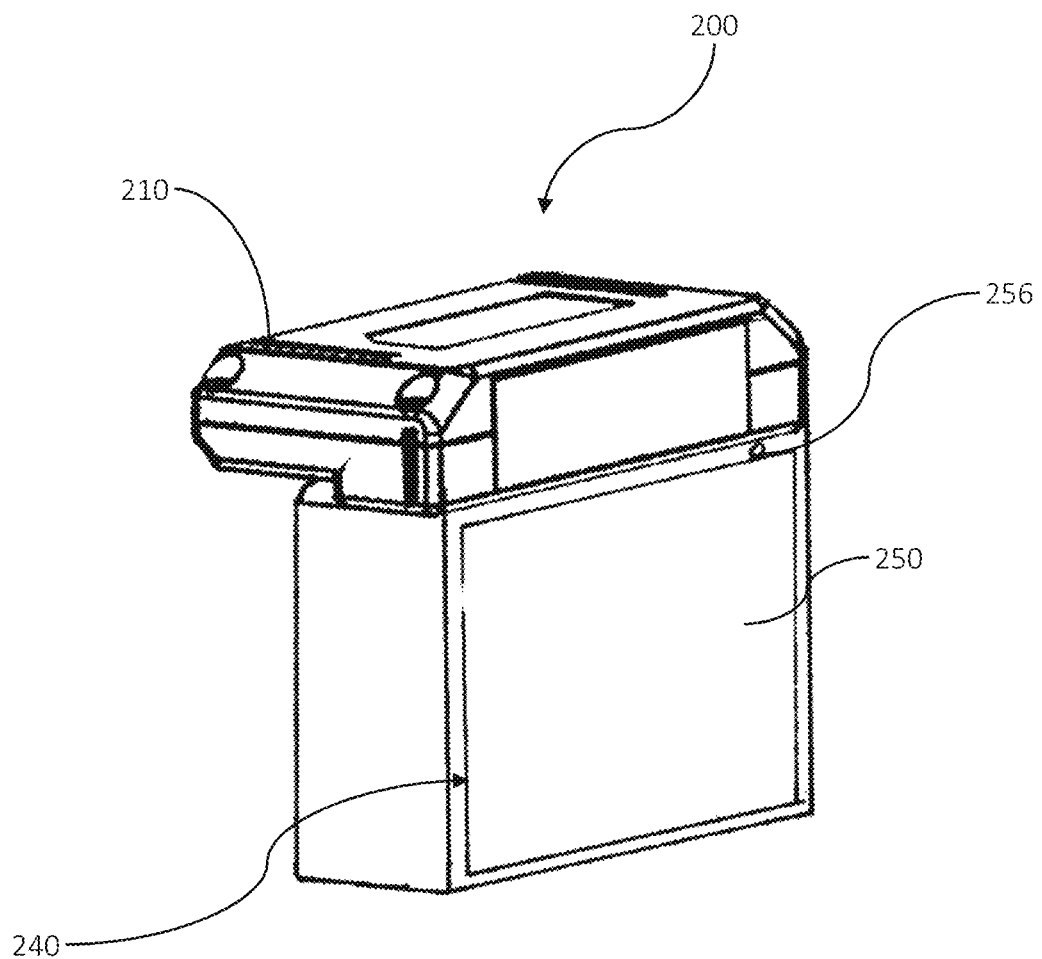
FIG. 3A is a rear, top, left side perspective view of FIG. 2 with a single rechargeable battery module installed according to one embodiment.

FIG. 3A shows the exterior facing side of smart retrofit battery pack 200. The lower portion of the pack contains a chamber 240 which houses removable rechargeable battery module 250. In one embodiment, battery module 250 is configured with Li-Ion cells, but it should be understood any suitable rechargeable battery technology may be used (e.g., Nickel-Cadmium, Nickel-Metal Hydride, Lithium Ion Polymer, etc.). LED power indicator 256 is located on the battery pack 200 above battery module 250. This indicator may be configured to communicate to the user how much power remains in the battery. LED 256 may illuminate one or more colors. While a single LED is shown in this embodiment, any suitable means of conveying battery status to the user may be used in alternate embodiments including but not limited to a plurality of LED lights, an LCD display, or a dot matrix display. Non-visual means to convey battery status can be used independent of or in concert with a visual means such as LED 256. On smart retrofit battery packs with connectivity options, push notifications may be sent via wireless connection to external devices.

Figure 3B:
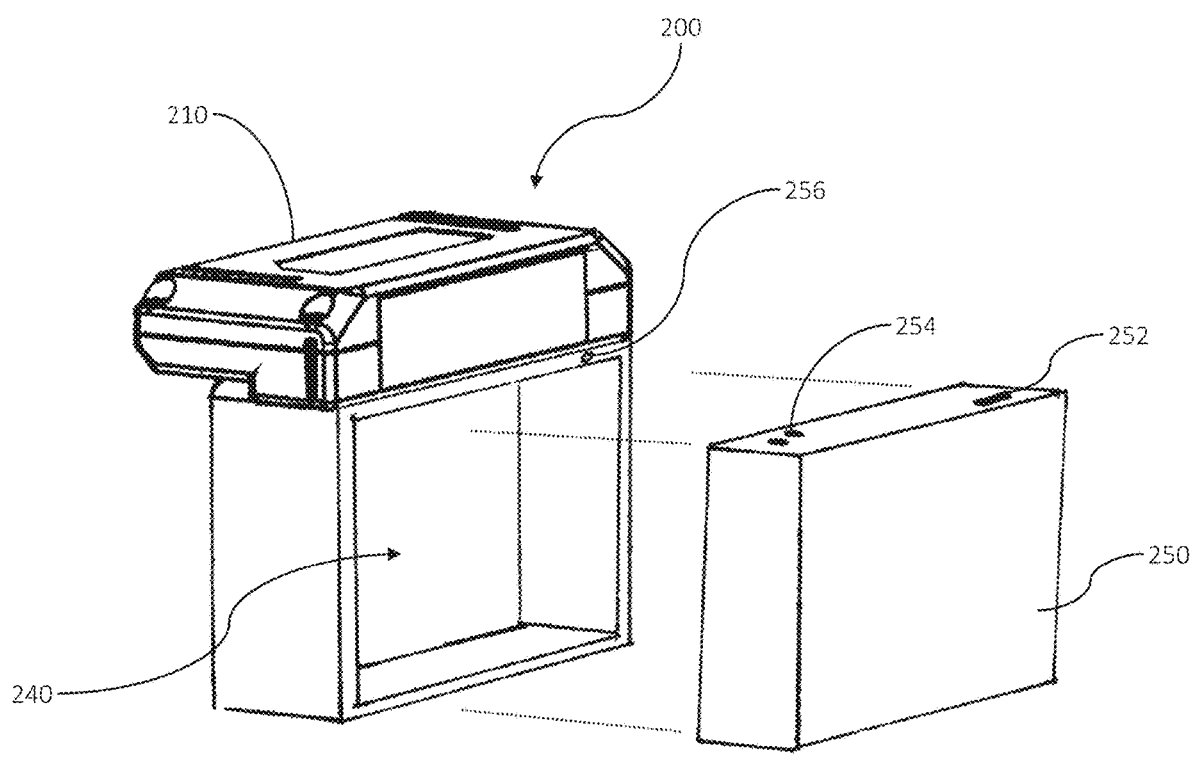
FIG. 3B is a rear, top, left side exploded perspective view of FIG. 3A.

FIG. 3B shows the smart retrofit battery pack 200 with rechargeable battery module 250 removed, revealing battery chamber 240. Battery charging port 252 and contact terminals 254 are shown disposed on the battery module 250. Charging port 252 is configured to receive an external charger from which electric power can be delivered. Charging port 252 may be configured as a micro USB, mini USB, or other commercially available connector port. Contact terminals 254 contact with corresponding terminals (not shown) located within the chamber 240 allowing power to be transmitted from the rechargeable battery module 250 to smart retrofit battery pack 200. In a single battery embodiment, one or more internal components (e.g., a non-removable internal rechargeable battery, a sufficiently sized capacitor, or a sufficiently sized super capacitor) may provide power to the electronic lock while battery module 250 is removed for charging. Additionally, one or more spare battery modules may be provided in a kit such that an alternate may be installed when the battery module 250 is removed for charging.

Figure 4A:
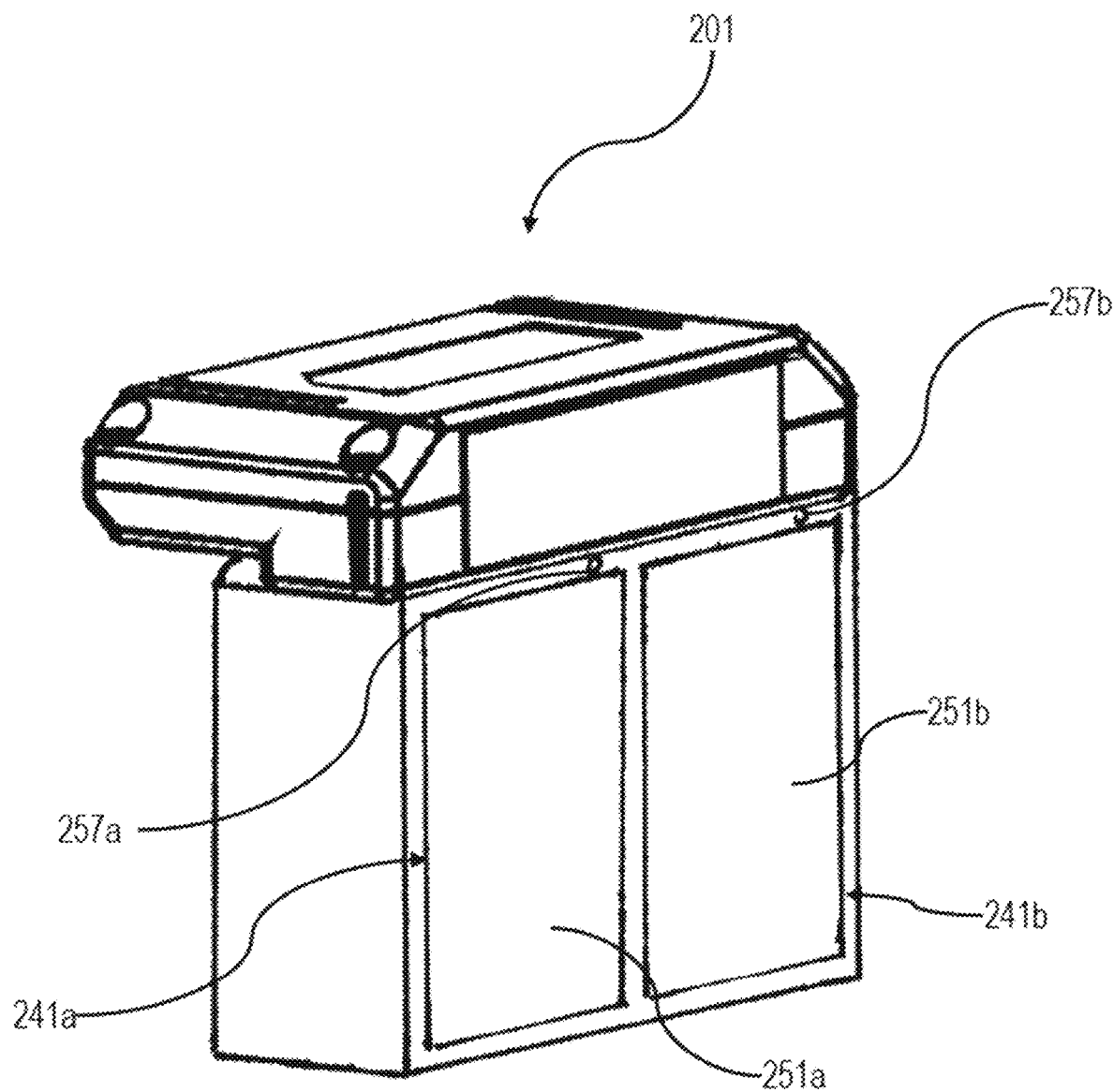
FIG. 4A is a rear, top, left side perspective view of FIG. 2 with two rechargeable battery modules installed.
Figure 4B:
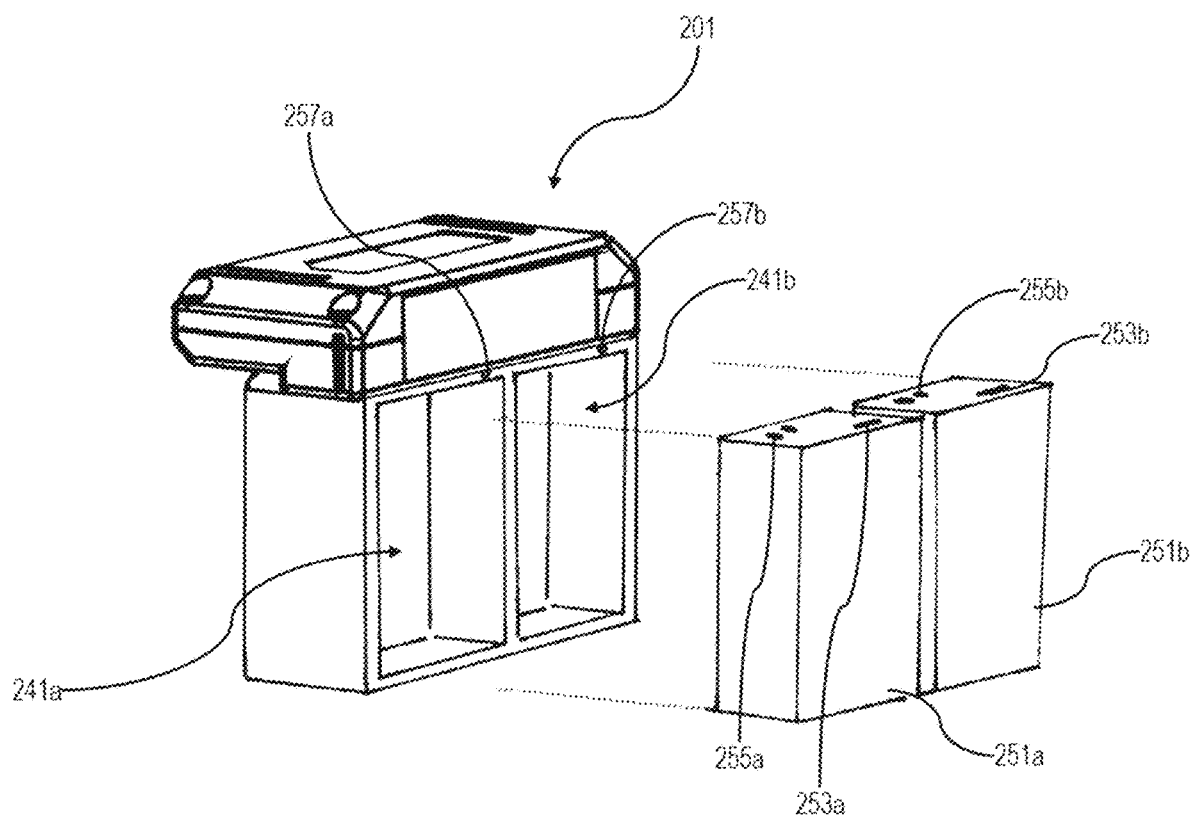
FIG. 4B is a rear, top, left side exploded perspective view of FIG. 4A.

FIGS. 4A and 4B show an alternate embodiment of smart retrofit battery pack 201 which contains two removable battery modules. The design and functionality of this embodiment is similar to that of the aforementioned single battery module smart retrofit battery pack 200, and thus not all details will be described with respect to this embodiment. Each battery module, 251a and 251b, includes a charging port, 253a and 253b, and contact terminals, 255a and 255b. Each battery module is installed in a chamber, 241a, 241b, located in the lower portion of the smart retrofit battery module. LED indicators 257a and 257b are located above each chamber. These display the battery status to the user. Any suitable alternative to this configuration such as those listed above can be used in place of the LEDs shown. In one embodiment, in a two battery module configuration, each battery module may individually power the lock. In this way, one battery module may be removed for charging while the second remains installed powering the lock. This would enable continuous operation with no power interruption. Additionally, any of the aforementioned internal components enabling power when both battery modules are removed may also be used.

Figure 5:
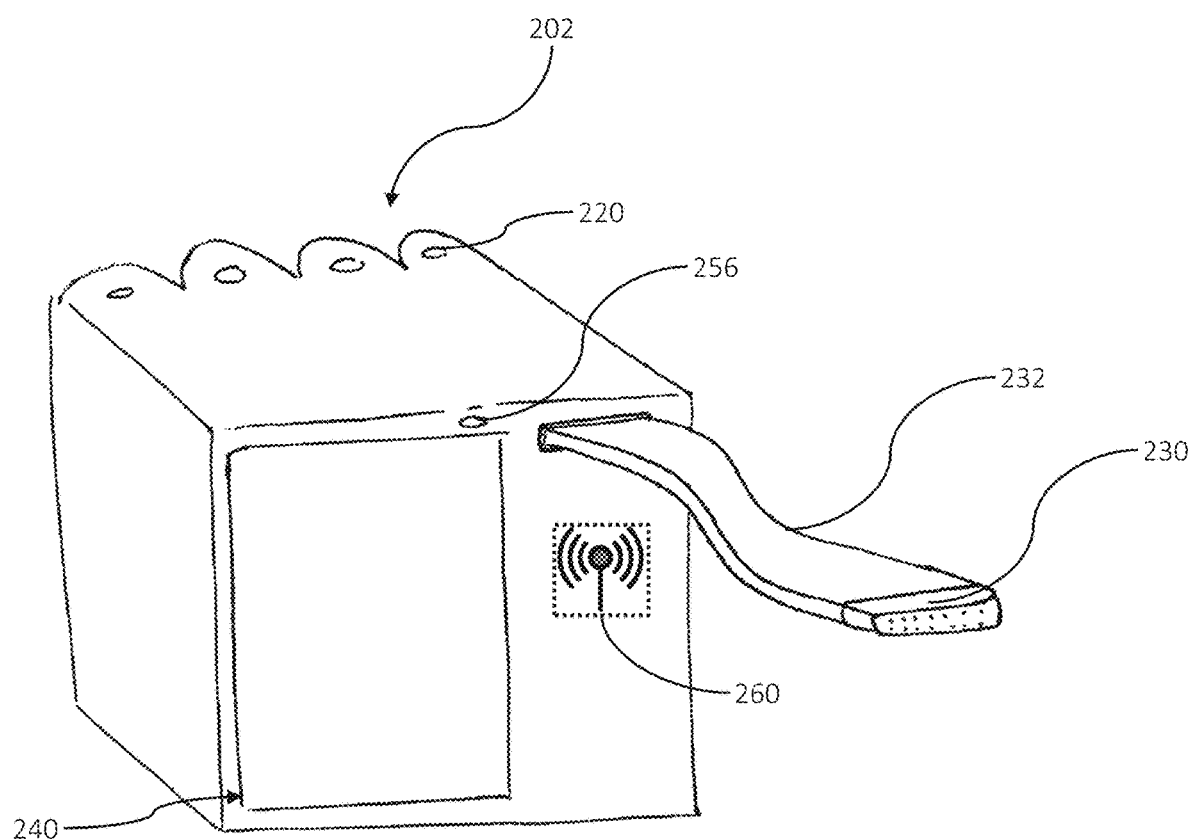
FIG. 5 is a rear, top, left side perspective view of a smart retrofit rechargeable battery pack with ribbon connector.

The embodiments of a smart retrofit battery pack, 200 and 201, shown in FIGS. 2C-4B depict a single housing comprising connector 230. FIG. 5 shows an alternate embodiments of a smart retrofit battery pack 202 configured with connector 230 at the proximal end of a ribbon cable 232 connected to the smart retrofit battery pack. While FIG. 5 depicts a ribbon cable 232, it should be appreciated that any suitable multi conductor connector familiar to one of skill in the art may be used. While FIG. 5 depicts the smart retrofit battery pack 202 with a single battery module 240, it should be understood that any number of battery modules may be used. This embodiment may also be configured with the wireless communication module 260 adjacent to the battery module(s) to reduce the footprint size of smart retrofit battery pack 230. This may enable compatibility with a plurality of different existing electronic locks.

Figure 6:
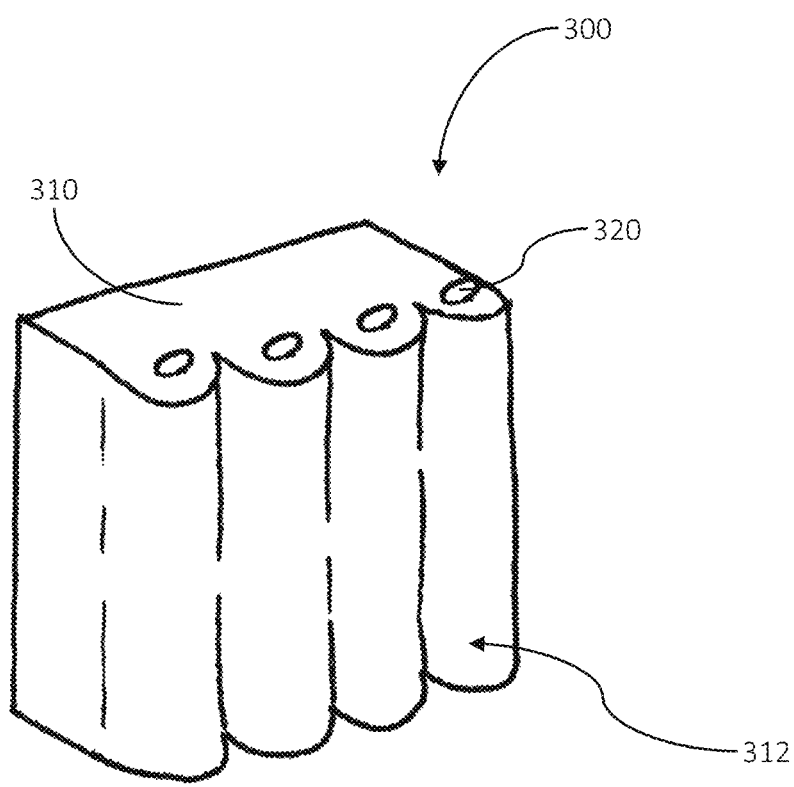
FIG. 6 is a front, top, right side perspective view of a retrofit rechargeable battery pack according to one embodiment.

FIG. 6 shows an alternate embodiment of a retrofit battery pack 300 without components for wireless communication. This pack comprises a main housing 310 which is configured to nest within interior cavity 140 without interfering with normal installation and removal of face plate 130 as shown in FIG. 1D. To facilitate this nesting, one embodiment of retrofit battery pack 300 may include ridges 312 as shown which may be configured to mate with the individual slots 143 of battery chassis 142. Additionally, these ridges may help align pack 300 during installation and maximize space utilization allowing for larger battery modules 350, 351a, 351b to be used. Of course, it should be appreciated that the ridges 312 need not be included in the housing. It should also be appreciated that the present disclosure is not limited with respect to what geometric features (e.g., chamfers, filets, extrusions, slots, etc.) are or are not included in the housing design. Any such features may be included in any suitable quantities or excluded to facilitate the neat nesting of retrofit battery pack 300 within an existing cavity.

In one embodiment, retrofit battery pack 300 may include its own faceplate or other exterior surface intended replace faceplate 130. In some embodiments, this surface may include additional functional components such as photovoltaic cells for recharging batteries, sensors (e.g., microphones, accelerometers, sensors for detecting light such as photoresistors, etc.), or lights.

The embodiment of a retrofit battery pack 300 shown in FIG. 6 includes contact pads 320 arranged to form electrical connections with positive and negative terminals 144a and 144b of battery chassis 142 when the module is installed. While not visible in FIG. 6, corresponding conductive pads may be located on the underside of housing 310 such that each terminal in battery chassis 142 is in direct contact with a contact pad 320. Once the module is installed, the electrical connection formed between the contact pads 320 and positive and negative terminals 144a and 144b enables the transmission of electricity (e.g. current and/or voltage) from battery pack 300 to electronic door lock 100. The electric power delivered would be used to drive internal components, for example, to lock or unlock the door, power sensors, for example, microphones and/or accelerometers, and more.

It should be appreciated that the battery chassis of the door lock may be removable from some pre-existing door locks. In such cases, the retrofit battery pack 300 may be configured geometrically different yet configured to fit with the door lock.

Figure 7A:
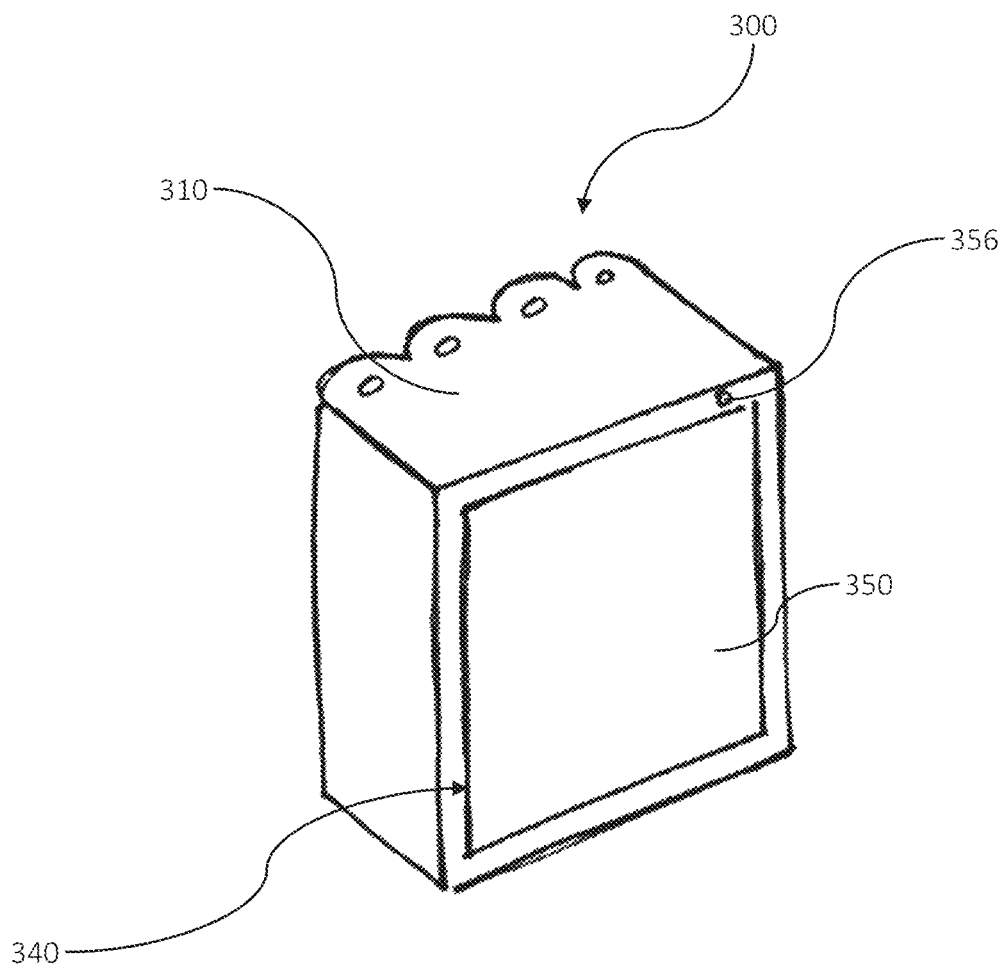
FIG. 7A is a rear, top, left side perspective view of FIG. 6 with a single rechargeable battery module installed.

FIG. 7A shows the exterior facing side of retrofit battery pack 300. The lower portion of the pack contains a chamber 340 which houses removable rechargeable battery module 350. In one embodiment, battery module 350 is configured to be a Li-Ion battery, but it should be understood any suitable rechargeable battery technology may be used (e.g., Nickel-Cadmium, Nickel-Metal Hydride, Lithium Ion Polymer, etc.). LED power indicator 356 is located on retrofit battery pack 300 above battery 350 when installed. This indicator may be used to communicate to the user how much power remains in the battery. LED 356 may illuminate one or more colors. While a single LED is shown in this embodiment, any suitable means of conveying battery status to the user may be used in alternate embodiments including but not limited to a plurality of LED lights, an LCD display, or a dot matrix display. Non-visual means to convey battery status can be used independent of or in concert with a visual means such as LED 356.

Figure 7B:
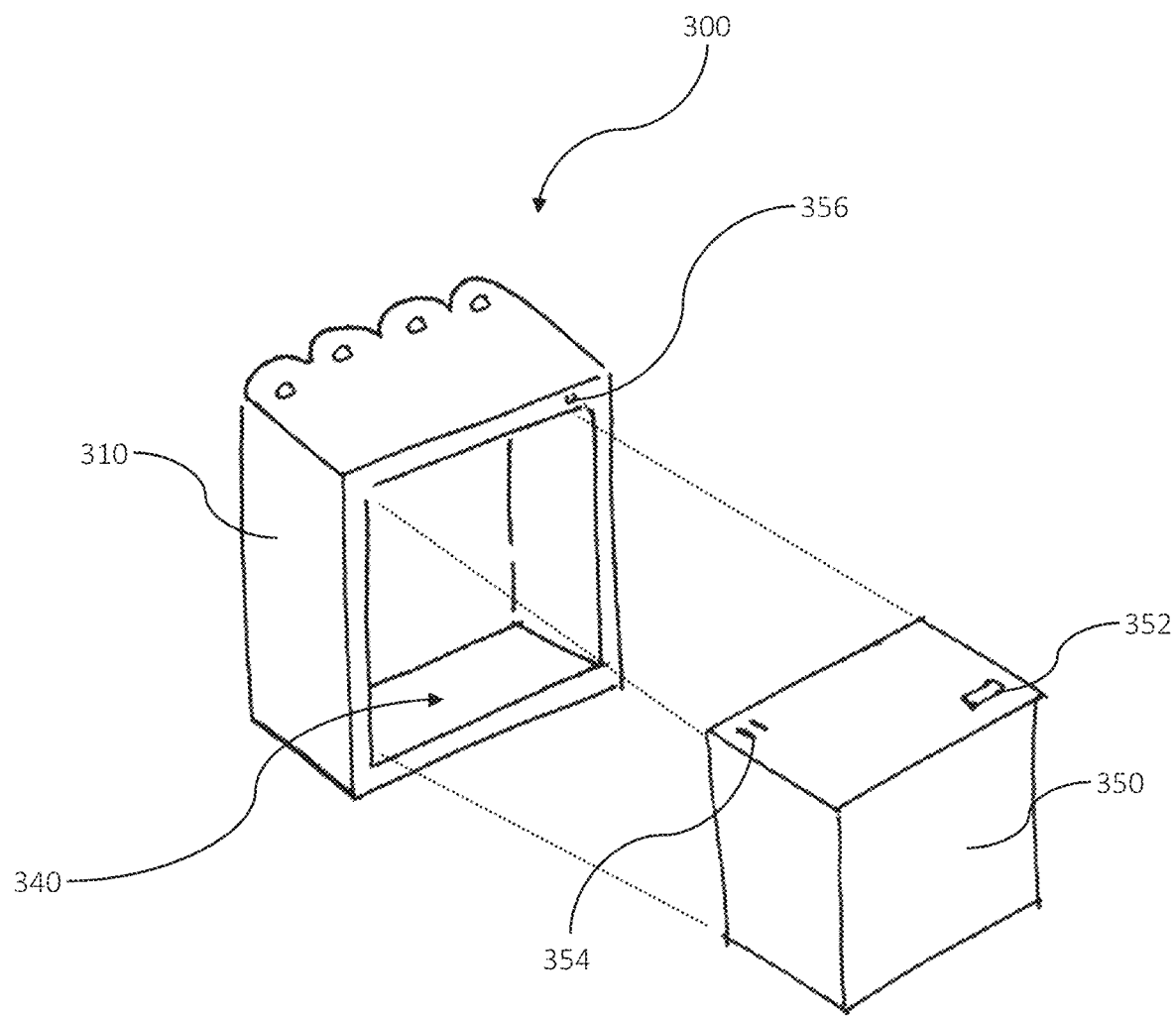
FIG. 7B is a rear, top, left side exploded perspective view of FIG. 7A.

FIG. 7B shows the retrofit battery pack 300 with rechargeable battery module 350 removed, revealing battery chamber 340. Battery charging port 352 and contact terminals 354 are shown disposed on battery module 350. Charging port 352 is configured to receive the an external charger from which electric power may be delivered. Charging port 353 may be configured as a micro USB, mini USB, or other commercially available connector port. Contact terminals 354 contact with corresponding terminals (not shown) located within the chamber 340 allowing power to be transmitted from rechargeable battery module 350 to retrofit battery pack 300. In a single battery embodiment, one or more internal components (e.g., a non-removable internal rechargeable battery, a sufficiently sized capacitor, or a sufficiently sized super capacitor) may provide power to the electronic lock while battery module 350 is removed for charging. Additionally, one or more spare battery modules may be provided in a kit such that an alternate may be installed when battery module 350 is removed for charging.

Figure 8A:
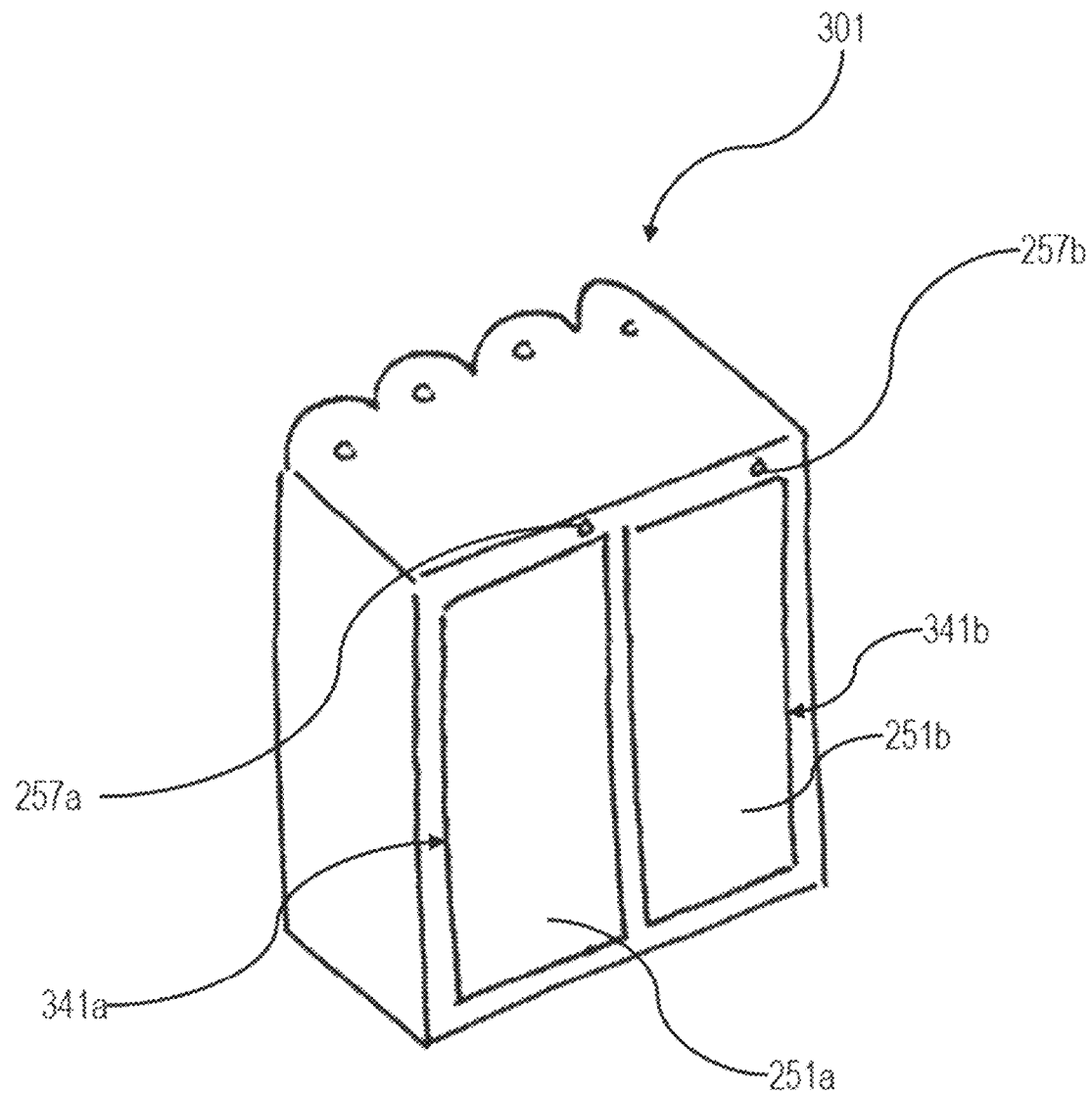
FIG. 8A is a rear, top, left side perspective view of FIG. 6 with two rechargeable battery modules installed.
Figure 8B:
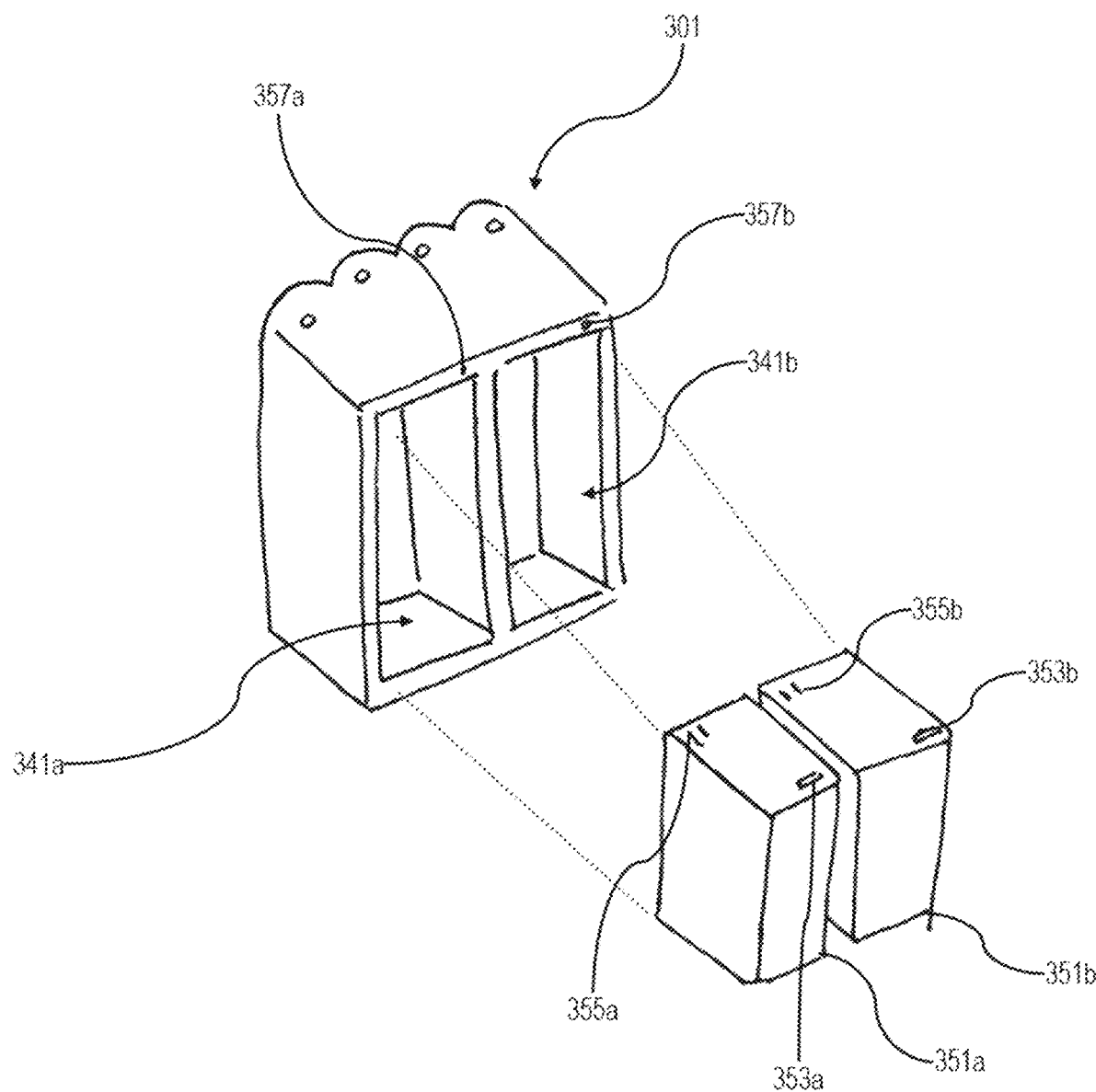
FIG. 8B is a rear, top, left side exploded perspective view of FIG. 8A.

FIGS. 8A and 8B show an alternate embodiment of retrofit battery pack 301 which contains two removable battery modules. The design and functionality of this embodiment is similar to that of the aforementioned single battery retrofit battery pack 300, and thus not all details will be described with respect to this embodiment. Each battery module, 351a and 351b, includes a charging port, 353a and 353b, and contact terminals, 355a and 355b. Each battery module is installed in a chamber, 341a, 341b, located in retrofit battery pack 300. LED indicators 357a and 357b are located above each battery module. These display the battery status to the user. Any suitable alternative to this configuration such as those listed above can be used in place of the LEDs shown. In one embodiment, in a two battery module configuration, each battery module may individually power the lock. In this way, one battery module may be removed for charging while the second remained installed powering the lock. This would enable continuous operation with no down time. Additionally, any of the aforementioned internal components enabling power when both battery modules are removed may also be used.

While the embodiments shown in FIGS. 3A through 8B contain one or two battery modules, it should be understood that any desirable number of battery modules may be used. Additionally, any suitable number of cells may be located within each of the one or two battery modules shown in FIGS. 3A through 8B. In all embodiments, the battery modules are shown as being rectangular. The design is not limited in this respect, and the battery modules may be on any suitable shape and/or configuration.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope disclosed herein. Accordingly, the foregoing description and drawings are by way of example only.

What is claimed is:

1. A smart retrofit battery pack for a preexisting electronic lock, the preexisting electronic lock having (a) a housing providing a connection interface and one or more battery slots with terminals and (b) a faceplate including one or more retainers and detachably coupled directly to the housing and secured thereto via the one or more retainers to (i) enclose the connection interface and the one or more battery slots and (ii) to define a cavity therebetween, the smart retrofit battery pack comprising:
 a battery pack housing configured to be received within the cavity of the preexisting electronic lock and enclosed therein by the faceplate where the one or more retainers of the faceplate engage with the housing of the preexisting electronic lock and not the battery pack housing, the battery pack housing including contact pads configured to engage with the terminals of the one or more battery slots;
 a plurality of rechargeable battery modules removably supported by the battery pack housing, the plurality of rechargeable battery modules configured to provide power to the contact pads to facilitate powering the preexisting electronic lock; and
 a wireless communication module coupled directly to or embedded within the battery pack housing and powered by the plurality of rechargeable battery modules, the wireless communication module configured to interact with the connection interface of the preexisting electronic lock to facilitate wireless communications between the preexisting electronic lock and at least one external wireless device.

2. The smart retrofit battery pack of claim 1, wherein the wireless communication module is configured to communicate with one or more environmental sensors including one or more of a microphone, an accelerometer, a camera, a proximity sensor, a motion detector, a thermometer, a door open/close sensor, a dawn/dusk sensor, and an occupancy sensor.

3. The smart retrofit battery pack of claim 1, wherein the wireless communication module is configured to communicate with a wireless communication module of at least one other electronic lock, whereby the wireless communication module is configured to operate as a hub for the at least one other electronic lock.

4. The smart retrofit battery pack of claim 1, wherein the battery pack housing includes an integrally formed connector configured to engage with the connection interface to connect the wireless communication module to the preexisting electronic lock.

5. The smart retrofit battery pack of claim 1, wherein the battery pack housing includes a ribbon cable configured to engage with the connection interface to connect the wireless communication module to the preexisting electronic lock.

6. The smart retrofit battery pack of claim 1, wherein the wireless communication module is compatible with one or more of the following wireless communication protocols: RFID, NFC, Wi-Fi, and z-wave.

7. The smart retrofit battery pack of claim 1, wherein the smart retrofit battery pack is configured such that when at least one of the plurality of rechargeable battery modules is removed from the battery pack housing, the remaining one or ones of the plurality of rechargeable battery modules is configured to provide power to the battery pack housing and the battery pack housing thereby is configured to provide power to the preexisting electronic lock.

8. The smart retrofit battery pack of claim 7, wherein the plurality of rechargeable battery modules comprises a first rechargeable battery module removably electrically coupled to the housing and a second rechargeable battery module removably electrically coupled to the battery pack housing, each of the first rechargeable battery module and the second rechargeable battery module is configured to independently provide power to the battery pack housing and the battery pack housing thereby is configured to provide power to the preexisting electronic lock.

9. The smart retrofit battery pack of claim 1, further comprising a power sensor, wherein the wireless communication module is configured to facilitate communicating a life of the plurality of rechargeable battery modules to an external wireless device based on power data acquired by the power sensor.

10. The smart retrofit battery pack of claim 1, further comprising a retrofit faceplate configured to replace the faceplate of the preexisting electronic lock.

11. The smart retrofit battery pack of claim 1, wherein the smart retrofit battery pack is separate from the preexisting electronic lock and is not a component thereof such that one or more conventional batteries can be inserted into the cavity without the smart retrofit battery pack present and the preexisting electronic lock remains operational.

12. The smart retrofit battery pack of claim 1, wherein the battery pack housing is separate from the housing, the connection interface, the one or more battery slots, and the faceplate of the preexisting electronic lock such that the battery pack housing can be disengaged from at least the one or more battery slots and removed from the cavity when the faceplate is removed from the preexisting electronic lock.

* * * * *